United States Patent [19]

Compton

[11] Patent Number: 5,499,114
[45] Date of Patent: Mar. 12, 1996

[54] DIGITAL IMAGE SCANNING APPARATUS WITH PIXEL DATA COMPENSATION FOR BAD PHOTOSITES

[75] Inventor: John T. Compton, LeRoy, N.Y.

[73] Assignee: Eastman Kodak Company, Rochester, N.Y.

[21] Appl. No.: 331,790

[22] Filed: Oct. 31, 1994

[51] Int. Cl.$^6$ .............................. H04N 1/04; H04N 9/64; H01L 27/00
[52] U.S. Cl. .................. 358/483; 358/482; 358/474; 348/246; 250/208.1
[58] Field of Search .................... 358/463, 471, 358/474, 482, 483; 348/246, 247; 250/208.1; 371/30, 31

[56] References Cited

U.S. PATENT DOCUMENTS

| | | | |
|---|---|---|---|
| 4,543,490 | 9/1985 | Gupta | 250/208.1 |
| 4,659,920 | 4/1987 | Nishiura et al. | 250/208.1 |
| 4,661,713 | 4/1987 | Besson et al. | 250/208.1 |
| 4,734,774 | 3/1988 | Skaggs et al. | 358/213 |
| 4,805,023 | 2/1989 | Younse et al. | 358/213 |
| 4,893,185 | 1/1990 | Fukushima et al. | 358/213 |
| 4,920,428 | 4/1990 | Lin et al. | 358/461 |
| 5,047,863 | 9/1991 | Pape et al. | 358/213 |
| 5,095,368 | 3/1992 | Miyakawa et al. | 358/213 |
| 5,144,446 | 9/1992 | Sudo et al. | 358/213 |
| 5,168,379 | 12/1992 | Mori et al. | 358/213 |
| 5,198,906 | 3/1993 | Yamashita | 358/213 |
| 5,291,293 | 3/1994 | Kapan | 348/246 |
| 5,381,175 | 1/1995 | Sudo et al. | 348/246 |

Primary Examiner—Edward L. Coles, Sr.
Assistant Examiner—Thomas D. Lee
Attorney, Agent, or Firm—Francis H. Boos, Jr.

[57] ABSTRACT

Pixel data from bad photosites of a linear imaging device is suppressed and replaced with pixel data from the next available good photosite. The loss of pixel data blocks from the beginning of the scan line is made up at the end of the scan line by continuing to write to memory the end pixel data a requisite number of times needed to complete the full scan line data.

3 Claims, 1 Drawing Sheet

DIGITAL IMAGE SCANNING APPARATUS WITH PIXEL DATA COMPENSATION FOR BAD PHOTOSITES

FIELD OF THE INVENTION

This invention relates generally to the field of film scanners employing linear imaging devices and, in particular, to apparatus for correcting for bad pixel data resulting from defective photosites in the linear imaging device.

BACKGROUND OF THE INVENTION

Modern film scanners typically employ a linear imaging device such as a charge-coupled-device (CCD) for scanning film images to generate digital signals representative of the image information. A linear charge coupled device (CCD) imager contains a linear array of light detecting photosites which accumulate charge depending on the light energy projected onto them. After some charge accumulation time, the charges in the photosites are transferred to a charge shifting structure so that the charges may be shifted out of the CCD and measured in signal processing circuits to produce a digital data signal for each image pixel, corresponding to photosites in the imaging device, which collectively are representative of the image projected onto the CCD.

Because of manufacturing variability in the CCD, dust or contaminants in the CCD optical path, light source non-uniformity, or other source of variation, the response of the individual photosites may not be uniform. The resulting site-to-site variation in the pixel data may be compensated for by use of gain and offset correction in the signal processing circuits. However, some photosite defects may be bad enough to cause the corresponding pixel data to fall outside the range which may be compensated. If the photosites are small and there are many of them, as in a high resolution scanner, the pixel data which cannot be compensated may not significantly affect the resulting image representation provided that the pixel data from the defective site is replaced with a data value that is consistent with the measurements from adjacent sites. Examples of image scanning apparatus that corrects for bad photosites by substitution of surrounding image pixel data are found in U.S. Pat. Nos. 4,920,428 and 5,168,379. In the '379 patent, a distinctive output signal from a bad photosite is used to indicate the existence of a bad photosite and, when recognized, pixel data from a previous photosite in the scan line or from an adjacent photosite are substituted for the pixel data from the bad photosite. In the '428 patent, photosite correction and attribute data stored in a memory are output in synchronism with photosite processing in the imaging device to apply offset and gain correction on a pixel-by pixel basis. The attribute data identifies a bad photosite and, when encountered, causes a bad pixel correction function to be invoked to substitute pixel data from a previous photosite in the imaging device or an average pixel data value derived from nearby photosites.

It sometimes happens that a bad photosite, or a succession of bad photosites, exists at the beginning of an image scan line. In this instance, there is no data from a previous good photosite in the scan line to substitute for the pixel data from the defective photosite or photosites. It is not acceptable to use pixel data from the last photosite in the previous scan line because it comes from the other end of the image. In the case of a linear imager, there is no vertically adjacent photosite from a previous scan line to serve as a source of good pixel data. Accordingly, there is a need for a fast and simple, low cost solution to providing bad pixel data correction in cases in which a number of one or more successive bad photosites occur at the beginning of an image scan line.

SUMMARY OF THE INVENTION

According to the present invention, therefore, image scanning apparatus is provided which comprises an imaging device having a plurality of photosites defining an image scan line; signal processing means for converting image signals from each of the photosites into digital pixel data representative of the response of each photosite to image light; and data memory means for accumulating digital pixel data transferred from the signal processing means. The apparatus also includes photosite memory means for storing attribute data indicating good and bad photosites in the imaging device including a number of one or more successive bad photosites at the beginning of the image scan line; and means for retrieving the attribute data from the memory means in synchronism with processing of individual photosites in the imaging device. According to a particular feature of the invention, the apparatus further includes data transfer means responsive to the retrieved attribute data for inhibiting transfer to the data memory of pixel data from the number of successive bad photosites at the beginning of the image scan line and for continuing to transfer to the data memory pixel data corresponding to the last good image photosite in the image scan line for a number of photosite periods required to provide a full scan line complement of pixel data. With this arrangement, pixel data from the bad photosites at the beginning of the scan line are replaced with pixel data from the next succeeding good photosites and pixel data for the proper number of photosites in the scan line is maintained by extending pixel data from the last good photosite in scan line by a sufficient number of pixel cycles to correspond to the requisite number of photosites in the scan line.

DETAILED DESCRIPTION OF THE INVENTION

Figure 1:
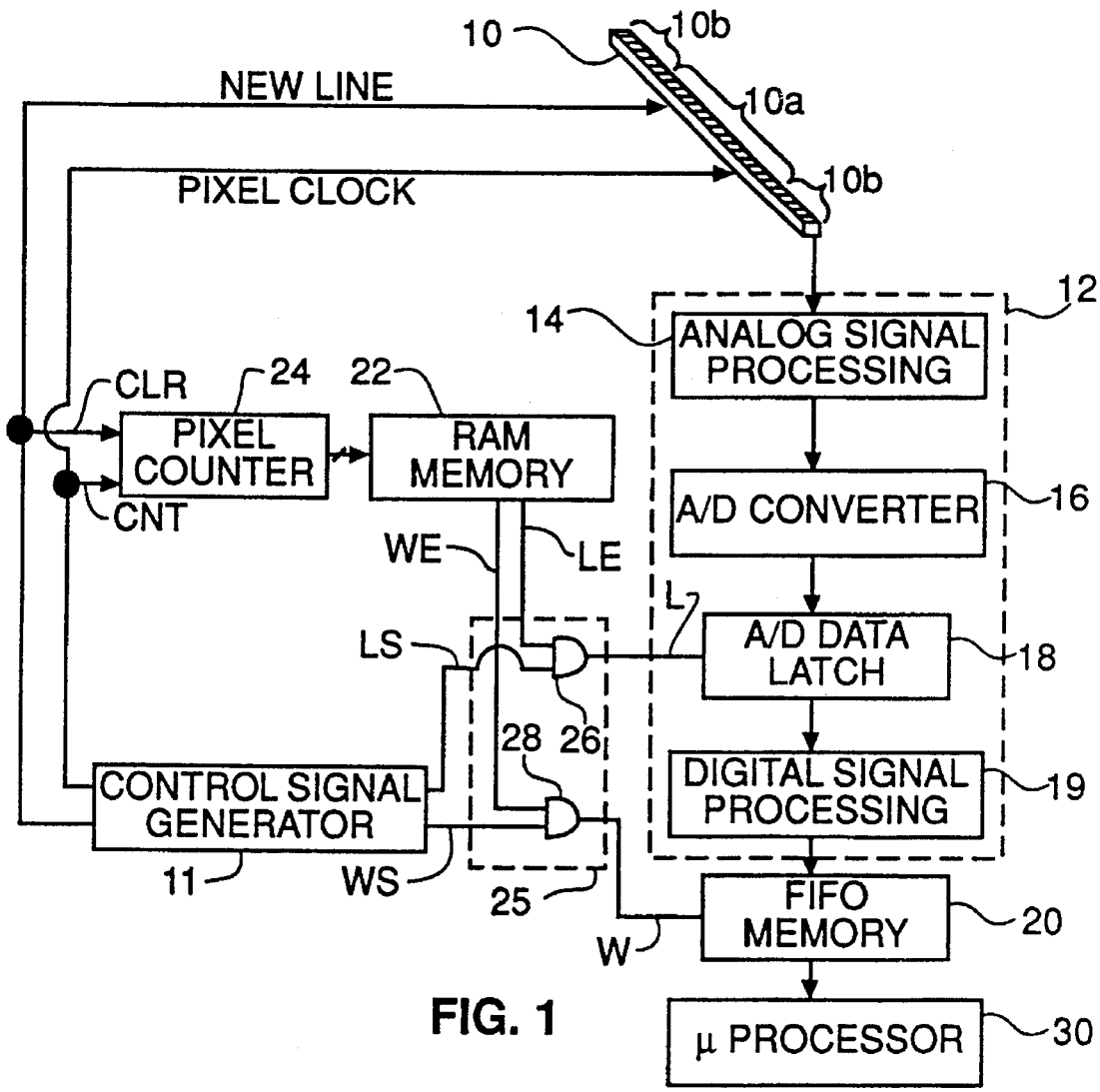
FIG. 1 is a functional block diagram of image scanning apparatus according to the present invention.

Referring to FIG. 1, there is shown image scanning apparatus including a CCD linear imaging device 10 having a plurality of photosites 10a defining an image scan line. Typically, a linear imager has a leading and ending series of photosites 10b used for non-imaging purposes such as for testing or to serve as dummy sites. The number of photosites 10a defining the extent of the image scan line determines the resolution of the image scanning. In a typical example, there may be 480 photosites 10a used for image scanning. A control signal generator 11 supplies various imager control signals including a "new line" signal and a "pixel clock" signal to control the sequencing of the imager's operation. A representative control arrangement is set forth in copending, commonly assigned U.S. application Ser. No. 08/298,725 filed Aug. 31, 1994, entitled "Apparatus and Method for Controlling a Linear Imaging Device", the disclosure of which is incorporated herein by reference.

The image scanning apparatus also includes signal processing means 12 for converting image signals from each of the photosites 10a into digital image pixel data representative of the response of each photosite to image light. Signal processing means 12 includes analog signal processing circuits 14 which operate to sequentially sample the charge values in each of the imager photosites to produce analog signal values representing these charge values. Analog processing circuits 14 may also include circuits for performing gain and offset compensation of each pixel analog signal in accordance with the teachings of copending, commonly assigned application Ser. No. 08/263,227 filed Jun. 21, 1994, entitled "Signal Processing Apparatus and Method for Offset Compensation of CCD Signals", the disclosure of which is incorporated herein by reference.

The compensated analog signals are coupled to an analog-to-digital (A/D) converter 16 where they are converted into digital image pixel data. After conversion, each block of pixel data is temporarily stored in A/D data latch 18 to be available for use on a pixel-by-pixel basis in digital signal processing circuits 19. Circuits 19 are operable in known manner, for example, to convert the pixel data from light transmissive values to film density values and to perform pixel averaging and pixel grouping . Details of digital signal processing circuits useful for circuits 19 are described more fully in copending, commonly assigned application Ser. No. 08/298,883, filed Aug. 31, 1994, entitled" Digital Image Signal Processing Apparatus and Method for Accumulating Blocks of Signal Data from an Imager", the disclosure of which is incorporated herein by reference.

After processing in signal processing circuits 12, the digital pixel data are written into data memory means, specifically FIFO memory 20, where the data are held for subsequent transfer on a first-in/first-out basis to microprocessor 30 where further image processing is performed.

The image scanning apparatus of the invention further comprises photosite memory means, including RAM memory 22, for storing attribute data indicating good and bad photosites in CCD imaging device 10. The attribute data is in the form of two bits, LE and WE. which are used to control latching of data in A/D data latch 18 and writing of processed data into FIFO memory 19. A pixel counter 24 is provided for retrieving the attribute data from memory 22 on a pixel-by-pixel basis in synchronism with processing of the individual photosites in imaging device 10.

The apparatus further comprises data transfer means, including AND gates 26 and 28, responsive to the attribute data from memory 22 for inhibiting transfer to FIFO data memory 20 of pixel data from the number of successive bad photosites at the beginning of said image scan line, as identified by the attribute data, and for continuing to transfer to the FIFO memory pixel data corresponding to the last good photosite in the image scan line for a number of photosite periods required to provide a full scan line complement of pixel data. Attribute data signals, referred to herein as latch enable (LE) and write enable (WE) signals are applied to first inputs of AND gates 26 and 28, respectively, for the duration of each photosite processing cycle. Control signal generator 11 outputs latch state (LS) and write state (WS) control signals to second inputs of AND gates 26,28, respectively. The state control signals operate to determine the timing, within the photosite processing cycles, of the application the latch (L) and write (W) control signals applied to latch 18 and FIFO memory 20, respectively. Control signal generator 11 also outputs clear (CLR) and count (CNT) signals to pixel counter 24 to reset pixel counting at the beginning of each scan line and to enable pixel counting in synchronism with photosite processing.

In operation, as processing of the photosites in imager 10 progresses from one site to the next, pixel counter 24 synchronously outputs addresses to RAM memory 22 at which attribute data comprising two bits per pixel data blocks are stored. Bit (LE) controls which pixel data is latched into A/D latch 18 and bit (WE) controls which pixel data is written into FIFO memory 20. If a photosite is defective, thus producing bad pixel data, the latch attribute bit (LE) is low at the input to AND gate 26 thereby blocking the latch signal L from latching pixel data from that photosite into A/D data latch 18. The write attribute data bit (WE) remains high at the input to AND gate 28 thus allowing pixel data from the previous good photosite to be written into FIFO memory 20 in substitution for the bad pixel data. If successive photosites are defective, the latch bit remains low for the corresponding number of photosite processing cycles continuing to write the last previous good photosite's pixel data into FIFO memory 20.

Figure 2:
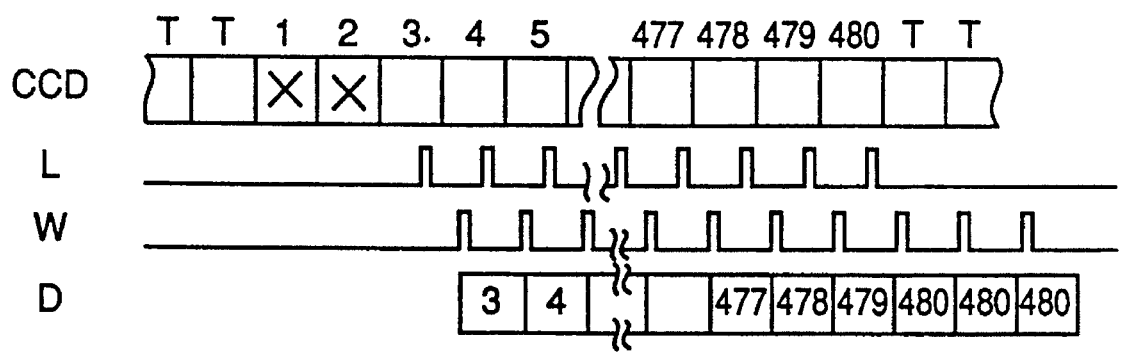
FIG. 2 is a signal timing diagram for pixel data from the apparatus of FIG. 1 illustrating the principles of the present invention.

A problem arises with respect to a bad photosite, or a succession of bad photosites, if it, or they, occur at the beginning of the image scan line. Suppressing of the latch signal (L) is not effective to correct the pixel data in FIFO memory 20 for the beginning photosite or photosites since there is no previous pixel data from the same scan line to write into the memory. Retaining and using the previous pixel data from the predecessor scan line data is not effective since the corresponding photosite is at the opposite side of the image. Referring to FIG. 2, this problem is solved in accordance with the invention by responding to the attribute data from RAM memory 22 suppress both the latch signal (L) and the write signal (W) for each of the beginning photosites for which there is bad pixel data and to recommence the latch and write operations when the next good photosite pixel data is processed. In this way, the next succeeding good photosite pixel data is substituted rather than from the previous good photosite. Thus, as seen in FIG. 2, pixel data block 3 becomes the first pixel data block in the scan line data stored in FIFO memory 20. Since data from the beginning pixel or pixels in the scan line are deleted, a full complement of pixel data blocks required for a complete scan line is achieved by continuing to write pixel data from the last photosite in the imager, in this case pixel block 480, until the requisite number of pixel data blocks for the scan line are stored in FIFO memory.

In the example illustrated in FIG. 2, it is assumed that two bad photosites exist at the beginning of the image scan line. Both the latch and write attribute data bits are low for the number 1 and 2 photosites. Accordingly, the latch (L) and write (W) control signals are suppressed for those two photosites. At the end of the scan line, the latch attribute data bit (LE) goes low after photosite 480, the end of the image scan line, but the write attribute data bit (WE) remains high for two more photosite processing periods (corresponding to the two photosites following site 480). Accordingly, the latch (L) control bit is suppressed after the processing and latching of pixel data 480 but the write control (W) bit repeats for two more cycles thus writing pixel data 480 into FIFO memory two more times, thus producing the requisite two additional pixel data blocks needed to complete the scan line data. As is well known, CCD imaging devices are typically provided with additional photosites, denoted (T) in the drawing, on either side of the photosites used for imaging. These additional photosites are typically available for test use or simply as dummy sites. Thus, additional photosite processing cycle times are readily available following the last regular imaging photosite for writing of the end photosite pixel data into memory. It will be appreciated from the drawing that the assumption from the foregoing description is that the pixel data 480 represents valid pixel data. If pixel data 480, and any previous contiguous photosite pixel data, is not valid, the latch attribute bit (LE) for these bad sites would be low and the last available good pixel data, for example, pixel 479 or 478, would be latched and available for writing into FIFO memory 20 the requisite number of times to complete the scan line.

The invention has been described with reference to a preferred embodiment. However, it will be appreciated that variations and modifications can be effected by a person of ordinary skill in the art without departing from the scope of the invention.

PARTS LIST

10 linear imaging device
11 control signal generator
12 signal processing circuits
14 analog signal processing circuits
16 A/D converter
18 A/D data latch
19 digital signal processing circuits
20 FIFO pixel data memory
22 RAM memory
24 pixel counter
25 data transfer means
26,28 AND gates
30 microprocessor

What is claimed is:

1. Image scanning apparatus comprising;

an imaging device having a plurality of photosites defining an image scan line;

signal processing means for converting image signals from each of said photosites into digital image pixel data representative of the response of each photosite to image light;

data memory means for accumulating pixel data transferred from the signal processing means;

photosite memory means for storing attribute data indicating good and bad photosites in said imaging device including a number of one or more successive bad photosites at the beginning of said image scan line;

means for retrieving said attribute data from said memory means in synchronism with processing of individual photosites in said imaging device; and data transfer means responsive to said retrieved attribute data for inhibiting transfer to the data memory of pixel data from said number of successive bad photosites at the beginning of said image scan line and for continuing to transfer to said data memory pixel data corresponding to the last good photosite in the image scan line for a number of photosite periods required to provide a full scan line complement of pixel data.

2. The apparatus of claim 1 wherein said data transfer means is operative to continue transfer of pixel data corresponding to the last photosite in the image scan line for a number of photosite periods equal to said number of successive bad photosites at the beginning of the image scan line for which pixel data transfer was inhibited.

3. The apparatus of claim 1 wherein said signal processing means includes an A/D converter and a data latch for temporarily storing converted image pixel data at the end of processing of the corresponding photosite; and said data transfer means is operative in response to said attribute data to inhibit latching of converted pixel data and to inhibit transfer of latch data to said data memory for said number of successive bad photosites at the beginning of the image scan line and is further operative to inhibit latching of converted pixel data following the last good photosite in the image scan line and to continue transfer of latched data corresponding to said last good photosite for said number of photosite periods.

* * * * *